(12) United States Patent
Dial et al.

(10) Patent No.: US 10,030,298 B2
(45) Date of Patent: Jul. 24, 2018

(54) METHOD FOR ALTERING METAL SURFACES

(71) Applicant: GENERAL ELECTRIC COMPANY, Schenectady, NY (US)

(72) Inventors: Laura Cerully Dial, Clifton Park, NY (US); William Thomas Carter, Galway, NY (US); Michael Francis Xavier Gigliotti, Jr., Glenville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 403 days.

(21) Appl. No.: 14/831,930

(22) Filed: Aug. 21, 2015

(65) Prior Publication Data

US 2017/0051389 A1 Feb. 23, 2017

(51) Int. Cl.
*C23C 10/08* (2006.01)
*C23C 10/28* (2006.01)
(Continued)

(52) U.S. Cl.
CPC .............. *C23C 10/08* (2013.01); *C23C 10/02* (2013.01); *C23C 10/28* (2013.01); *C23C 10/30* (2013.01); *C23C 10/60* (2013.01); *C23C 24/08* (2013.01); *C23F 1/20* (2013.01); *C23F 1/44* (2013.01); *C23F 17/00* (2013.01); *C25D 5/50* (2013.01); *C25D 3/12* (2013.01)

(58) Field of Classification Search
CPC combination set(s) only.
See application file for complete search history.

(56) References Cited

U.S. PATENT DOCUMENTS 3,640,815 A 2/1972 Schwartz et al.
2,647,517 A 3/1972 Milidantri et al.
(Continued)

FOREIGN PATENT DOCUMENTS

CA 2 708 888 A1 7/2009
CA 2 785 322 A1 7/2011
(Continued)

OTHER PUBLICATIONS

"Quality Metal Finishing Guide—Mass Finishing", Metal Finishing Suppliers' Association, vol. 1-A, Issue 7, pp. 1-67, Oct. 1989.
(Continued)

*Primary Examiner* — Jenny R Wu
(74) *Attorney, Agent, or Firm* — GE Global Patent Operation; John Darling

(57) ABSTRACT

A surface of an article is modified by first disposing a nickel-enriched region at the surface of a substrate, then enriching the nickel-enriched region with aluminum to form an aluminized region, and finally removing at least a portion of the aluminized region to form a processed surface of the substrate. Upon removal of this material, the roughness of the surface is reduced from a comparatively high initial roughness value to a comparatively low processed roughness value. In some embodiments, the processed roughness is less than about 95% of the initial roughness. Moreover, the sequence of steps described herein may be iterated one or more times to achieve further reduction in substrate surface roughness.

19 Claims, 1 Drawing Sheet

Figure 1:
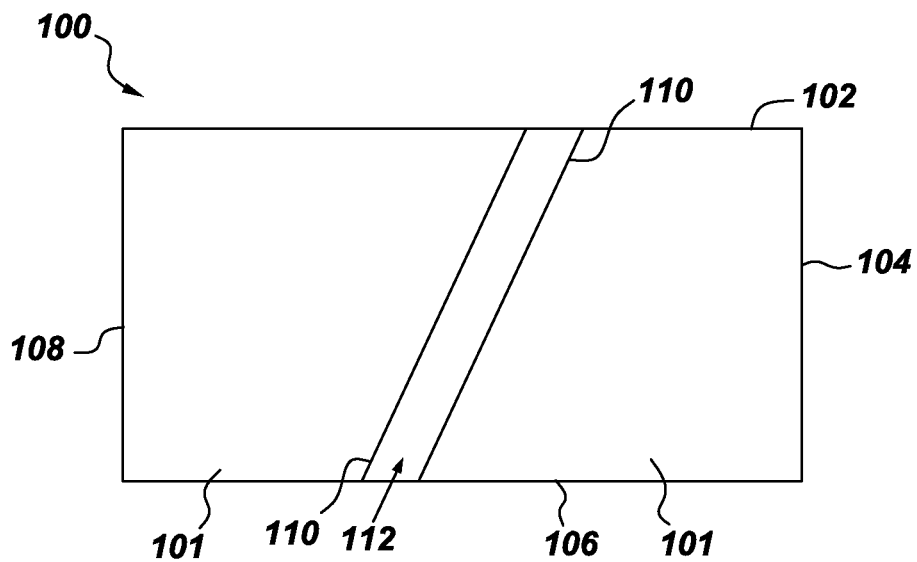

(51) Int. Cl.
*C23C 10/02* (2006.01)
*C23C 10/60* (2006.01)
*C23F 1/20* (2006.01)
*C23F 1/44* (2006.01)
*C23F 17/00* (2006.01)
*C23C 10/30* (2006.01)
*C25D 5/50* (2006.01)
*C23C 24/08* (2006.01)
*C25D 3/12* (2006.01)

(56) References Cited

U.S. PATENT DOCUMENTS

| | | | |
|---|---|---|---|
| 3,692,554 | A | 9/1972 | Bungardt et al. |
| 4,260,654 | A | 4/1981 | Baldi |
| 4,425,185 | A | 1/1984 | Fishter et al. |
| 5,725,905 | A | 3/1998 | Walter et al. |
| 5,833,829 | A | 11/1998 | Foster |
| 5,837,385 | A | 11/1998 | Schaeffer et al. |
| 6,352,636 | B1 | 2/2002 | Wei et al. |
| 6,494,960 | B1 | 12/2002 | Macdonald et al. |
| 6,599,416 | B2 | 7/2003 | Kool et al. |
| 6,630,244 | B1 | 10/2003 | Mao et al. |
| 6,758,914 | B2 | 7/2004 | Kool et al. |
| 6,793,738 | B2 | 9/2004 | Kool et al. |
| 6,833,328 | B1 | 12/2004 | Kool et al. |
| 6,863,738 | B2 | 3/2005 | Kool et al. |
| 6,875,292 | B2 | 4/2005 | Worthing, Jr. et al. |
| 6,953,533 | B2 | 10/2005 | Kool et al. |
| 6,969,457 | B2 | 11/2005 | MacDonald et al. |
| 7,163,718 | B2 | 1/2007 | Das et al. |
| 7,270,764 | B2 | 9/2007 | Wustman et al. |
| 7,270,852 | B2 | 9/2007 | Kool et al. |
| 7,541,069 | B2 | 6/2009 | Tudhope et al. |
| 7,798,388 | B2 | 9/2010 | Crockett et al. |
| 7,829,142 | B2 | 11/2010 | Kool et al. |
| 7,935,642 | B2 | 5/2011 | Kool et al. |
| 8,506,836 | B2 | 8/2013 | Szuromi et al. |
| 9,793,613 | B2 * | 10/2017 | Wilson .................. H01Q 13/00 |
| 2007/0151948 | A1 | 7/2007 | Kool et al. |
| 2007/0190245 | A1 | 8/2007 | Gupta et al. |
| 2007/0298269 | A1 | 12/2007 | Kool |
| 2008/0202552 | A1 | 8/2008 | Kool et al. |
| 2009/0261068 | A1 | 10/2009 | Kool et al. |
| 2010/0062180 | A1 | 3/2010 | Tuppen et al. |
| 2010/0136240 | A1 | 6/2010 | O'Connell et al. |
| 2010/0151125 | A1 | 6/2010 | Kool et al. |
| 2011/0311389 | A1 | 12/2011 | Ryan et al. |
| 2012/0094021 | A1 | 4/2012 | MacGregor et al. |
| 2012/0222306 | A1 | 9/2012 | Mittendorf et al. |
| 2013/0071562 | A1 * | 3/2013 | Szuromi ............... B22F 3/1055 427/237 |
| 2015/0060403 | A1 | 3/2015 | Carter et al. |

FOREIGN PATENT DOCUMENTS

| | | |
|---|---|---|
| EP | 2236652 A2 | 10/2010 |
| GB | 1106780 A | 3/1968 |
| JP | H09-312275 A1 | 12/1997 |
| JP | 2000-192258 A | 7/2000 |
| JP | 2003013745 A | 1/2003 |
| JP | 2003193866 A | 7/2003 |
| JP | 2005068556 A | 3/2005 |
| JP | 2015-108175 A | 6/2015 |
| WO | 2010134917 A1 | 11/2010 |

OTHER PUBLICATIONS

Wess et al., "Environmentally Acceptable Stripping of Nickel Aluminide Coatings", The Pennsylvania State University—2nd Annual Joint Service Pollution Prevention Conference and Exhibition, pp. 1-7, Aug. 7, 1997.

Taminger et al., "Effect of Surface Treatments on Electron Beam Freeform Fabricated Aluminum Structures", NASA Technical Reports Server (NTRS), pp. 460-470, 2004.

Lee et al., "Cyclic Oxidation Behavior of a Cobalt Aluminide Coating on Co-base Superalloy AMS 5608", Surface and Coatings Technology, vol. No. 200, Issue No. 5-6, pp. 1225-1230, Nov. 21, 2005.

International Search Report and Written Opinion issued in connection with related WO Application No. PCT/US2014/053373 dated Dec. 9, 2014.

Non-Final Rejection towards related U.S. Appl. No. 14/018,537 dated May 4, 2015.

Final Rejection towards related U.S. Appl. No. 14/018,537 dated Nov. 3, 2015.

European Search Report and Written Opinion issued in connection with corresponding EP Application No. 16184944.3 dated Jan. 31, 2017.

Office Action issued in connection with related CA Application No. 2922554 dated Feb. 6, 2017.

Japanese Search Report issued in connection with corresponding JP Application No. 2016-540291 dated . Feb. 23, 2017.

Office Action issued in connection with related JP Application No. 2016-540291 dated on Apr. 4, 2017.

B. M. Warnes et al., "Cyclic oxidation of diffusion aluminide coatings on cobalt base super alloys," Surface and Coatings Technology, vol. 148, Jun. 15, 2001, pp. 163-170.

R. Streiff et. al, "Corrosion Resistant Modified Aluminide Coatings," J. Materials Engineering, vol. 10, No. 1, 1998, pp. 15-26.

Y. Q. Wang et al., "Synthesis of simple and platinum-modified aluminide coatings on cobalt (Co)-base superalloys via a vapor phase aluminizing process," Surface & Coatings Technology, vol. 203, 2008, pp. 256-263.

Machine translation and Notification of Reasons for Refusal issued in connection with corresponding JP Application No. 2016-160270 dated Aug. 29, 2017.

Office Action issued in connection with corresponding CA Application No. 2939735 dated Sep. 19, 2017.

Machine translation and Notification of Reasons for Refusal issued in connection with corresponding JP Application No. 2016-160270 dated Dec. 5, 2017.

* cited by examiner

METHOD FOR ALTERING METAL SURFACES

BACKGROUND

This disclosure generally relates to methods for fabricating articles; more particularly, this disclosure relates to methods for reducing surface roughness of articles, such as, but not limited to, metal articles formed by additive manufacturing processes.

Manufacturing methods that rely on the addition of material to "build" components portion-by-portion, such as layer-by-layer, often suffer from unduly high levels of surface roughness, attributable in part to incomplete leveling of surfaces formed, for example, by melted (or partially melted) and solidified powder feed-stocks. Spray-forming and thermal spraying are two such processes used to form coatings or freestanding articles. The so-called "additive manufacturing" methods are further examples of such processes, and these methods are of particular interest to industry for their potential to fabricate complex three-dimensional parts with reduced cost and increased throughput relative to conventional metalworking processes such as casting and forging. The term "additive manufacturing" is defined by the American Society for Testing and Materials as the "process of joining materials to make objects from three-dimensional model data, usually layer upon layer, as opposed to subtractive manufacturing methodologies, such as traditional machining and casting." Such processes have demonstrated capability to manufacture components with complex features, including, for example, internal channels for facilitating fluid flow, such as for cooling or fluid delivery.

High surface roughness on external surfaces or internal channel walls may act to hinder component functionality where, for example, fluid flow plays a role in the working of the component. For example, turbine airfoil components such as blades and vanes typically specify upper limits for roughness of certain external surfaces to maintain aerodynamics of gas flow within design parameters. Moreover, components that facilitate flow of liquid are typically desired to have flow channels, such as internal flow channels, with channel wall surface roughness below specified limits to promote efficient flow and reduce fouling of channels by debris. Finally, unduly high surface roughness may also detract from mechanical properties of articles; for instance, high surface roughness may promote fatigue crack initiation in some applications, reducing the life of components relative to those having a smoother surface.

Given the potentially detrimental effects of high surface roughness, there is a need for methods to reduce surface roughness for components, such as components fabricated by additive manufacturing methods, where surface roughness issues are common.

BRIEF DESCRIPTION

Embodiments of the present invention are provided to meet this and other needs. One embodiment is a method for altering the surface of an article. The method comprises at least the following steps: disposing a nickel-enriched region at a surface of a substrate, wherein the substrate has an initial composition prior to the disposing step, wherein the surface has an initial roughness, and wherein the nickel-enriched region has a higher nickel concentration than the initial composition of the substrate; heat treating the substrate to form a diffusion zone within the substrate; enriching at least a portion of the nickel-enriched region with aluminum to form an aluminized region; and removing at least a portion of the aluminized region to form a processed surface of the substrate. After the removing step, the processed surface has a processed surface roughness that is less than the initial roughness.

Another embodiment is a method for reducing roughness of a surface. The method comprises at least the following steps: disposing a nickel-enriched region at a surface of a substrate, the nickel-enriched region having a higher nickel concentration than an initial composition of the substrate, wherein the surface has an initial surface roughness, wherein the initial surface roughness is an arithmetic average roughness (Ra) of at least about 200 microinches; heat treating the substrate to form a diffusion zone within the substrate; enriching at least a portion of the nickel-enriched region with aluminum to form an aluminized region; and removing at least a portion of the aluminized region to form a processed surface of the substrate. After the removing step, the surface has a processed roughness that is less than the initial roughness.

DRAWINGS

Figure 2:
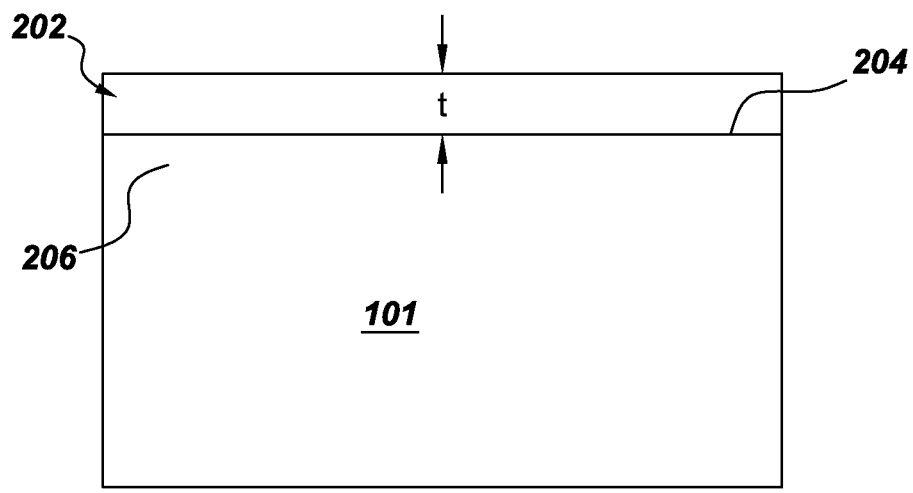

These and other features, aspects, and advantages of the present invention will become better understood when the following detailed description is read with reference to the accompanying drawing in which like characters represent like parts, wherein:

FIG. 1 is a schematic cross section view of an illustrative article in accordance with some embodiments of techniques described herein; and FIG. 2 is a schematic cross-section view of an illustrative article in accordance with some embodiments of techniques described herein.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

The techniques described herein serve to reduce the surface roughness of articles, regardless of how those articles are fabricated. However, given the propensity of additive manufacturing methods to produce articles with unduly high surface roughness, emphasis will be given in the description below of the applicability of the described methods to improve additively manufactured articles. This emphasis should not be construed as limiting, however, and the more general applicability of the described methods will be apparent to practitioners in the manufacturing arts.

As it is used in this description, and indeed as it is typically used in the field of surface metrology, the term "surface roughness" (also, interchangeably herein, "roughness") generally refers to a statistical expression of high-frequency deviations of surface height from a nominal baseline value, often a local mean surface height. As is well-known in the art, many different parameters may be used to describe the roughness of a given surface, and each of these parameters has advantages and disadvantages. Profile roughness parameters such as the arithmetic average of absolute values ($R_a$) and the root mean squared roughness ($R_q$) are commonly used parameters because they are readily measured using standard profilometry equipment and are easily calculated, though such measurements may not always provide the most useful description of a surface's roughness characteristics. Standard B46.1 of the American Society of Mechanical Engineers (ASME) provides procedures for measuring and calculating several different profile roughness parameters, including those noted above. Other types of roughness measures include parameters calculated over an area, as described in ISO 25178 published by International Organization for Standardization. Still other parameters are known and described in the literature.

For the purposes of the present description, "surface roughness" (and its abbreviated equivalent, "roughness") will be understood to include any one or more of these parameters, wherein a surface of interest on an article to be processed in accordance with the description herein has an "initial roughness" prior to being exposed to the method, and a "processed roughness" after being exposed to the method. In one embodiment, the roughness parameter is a profile roughness parameter such as $R_a$. For example, in some embodiments, the surface of the article has an initial roughness of at least about 200 micro-inches (5 micrometers) $R_a$.

In accordance with an embodiment of the described method, a surface of an article is modified by first disposing a nickel-enriched region at the surface of a substrate, then enriching the nickel-enriched region with aluminum to form an aluminized region, and finally removing at least a portion of the aluminized region to form a processed surface of the substrate. Upon removal of this material, the roughness of the surface is reduced from a comparatively high initial roughness value to a comparatively low processed roughness value. In some embodiments, the processed roughness is less than about 95% of the initial roughness. Moreover, the sequence of steps described herein may be iterated one or more times to achieve further reduction in substrate surface roughness.

The thickness of the aluminized region should be at least comparable to the amount of material needed to be removed to achieve the desired reduction in surface roughness. As will be discussed in more detail, below, achieving significant thicknesses, such as greater than 50 micrometers, for an aluminized region can be quite difficult for certain substrate materials, such as materials that include significant amounts of cobalt. Techniques described herein in part address this problem of achieving sufficient aluminized region thickness to effect desirable smoothing of rough surfaces.

As used herein, a "surface" constitutes any portion of an article that is in contact with the article's ambient environment, and the term "substrate" encompasses the material underlying the surface. Referring now to FIG. 1, a cross-sectional view of an illustrative article 100, the term "surface" with respect to article 100 encompasses not only external surfaces 102, 104, 106, 108, but also internal surfaces such as a wall 110 of an internal channel 112 disposed within article 100. Therefore, in one particular example, the disposing step includes disposing a nickel-enhanced region at a surface of an internal channel 112, where the surface being modified includes the channel wall 110. Substrate 101 is the quantity of material underlying any surface being treated in accordance with the described techniques, be it an external surface (such as surface 102) or internal surface 110.

In some embodiments, at least a portion of the article—for example, substrate 101—includes additively manufactured material, that is, material disposed by an additive manufacturing technique. Typical additive manufacturing methods involve precise deposition of material (as by micro-pen deposition of a liquid followed by curing) or selective, localized densification of material (as by selective melting and solidification or sintering a powder, using a laser or other highly focused form of energy) to form a series of thin, cross-sectional slices, or layers, that in aggregate build a three-dimensional component. The layer formation generally is done in accordance with a computer-based model or other design model that describes the location and dimensions of internal and external surfaces of the article in three-dimensional space. One particular example is a process referred to in the art as direct metal laser melting (DMLM). The DMLM process includes the use of a laser to melt and solidify a powdered starting material, layer-by-layer, into a three dimensional object. Hence, an "additively manufactured material" may often be identified as material comprising a series of layers of former powder particles that have been joined together by a sintering operation or, in most cases involving metal materials, a melt-and-solidification operation, associated with the additive manufacturing process.

In some embodiments, the method described herein includes forming substrate 101 by a process that includes an additive manufacturing step. Substrate 101, when formed using one or more additive manufacturing processes, may have significant surface roughness caused, for example, by inclusion of incompletely melted metallic powder, and by contamination, debris, oxidation, melt pool instability, and other undesirable mechanisms that may occur as by-products of any of these various processes.

In some embodiments, the article is a component of a turbine assembly. Examples of such components include components that include airfoil portions, such as rotor blades and stator vanes. Other examples include shafts, shrouds, fan components, compressor components, and combustion components. Various turbine assembly components often include internal channels 112 to facilitate flow of a fluid, including, for example, cooling air or, as another example, liquids such as coolants or fuel. Accordingly, the techniques described herein may be applied to external surfaces, internal surfaces, or both of these, occurring on or within such components.

Substrate 101 typically comprises a metal, such as, but not limited to, cobalt, iron, nickel, aluminum, titanium, or any combination that includes one or more of these. Prior to the disposition of the nickel-enriched region, substrate 101 has an initial composition. In one embodiment, this initial composition of substrate 101 includes at least 50 percent by weight cobalt. Metal compositions that are rich in cobalt are often comparatively difficult to coat with thick layers (such as layers having greater than 50 micrometers thickness) of aluminide, due to various issues related in part to relatively slow diffusion rate of cobalt within cobalt aluminide. By first enriching the surface to be treated with nickel, the formation of aluminum-enriched compounds, such as aluminides, may be sufficiently facilitated to enable formation of thick layers under practical processing conditions. Examples of cobalt-bearing alloys that may benefit from the techniques described herein include, but are not limited to, cobalt-bearing alloys that include less than 25 percent by weight nickel, such as ASTM F75, Stellite® 21, Alloy L-605, MAR-M® 509, FSX-414, X-40, MULTIMET®, and Haynes® 188. Although this effect is particularly advantageous for cobalt-bearing substrates, the benefits conferred by the presence of the nickel-enriched region in facilitating subsequent aluminization are not limited to such substrate materials.

In one particular embodiment, the initial composition of substrate 101 comprises an alloy comprising cobalt and chromium. An example of such an alloy includes an alloy that comprises from about 26 weight percent to about 30 weight percent chromium and from about 4 weight percent to about 7 weight percent molybdenum, with the balance comprising cobalt. Other alloying elements may be present as well. This illustrative alloy has been used with some success in additive manufacturing of some metal components. Other examples of useful alloys for the initial composition of substrate 101 include nickel-based superalloys, cobalt-based superalloys, and iron-based superalloys, and other high temperature alloys that contain significant amounts of nickel, cobalt, and/or iron. An alloy is considered "high temperature" for the purposes of this description if the execution of the various steps described herein do not irreparably harm the properties of the substrate material, as by melting or partially melting the material, for example.

Referring now to FIG. 2, a nickel-enriched region 202 is disposed at a surface 204 of substrate 101. Surface 204, as noted previously may be any external or internal surface of substrate 101. The extent of nickel-enriched region 202 is defined as that region having a higher nickel concentration than the initial composition of substrate 101. Where the process used to dispose the nickel-enriched region 202 is performed at a combination of time and temperature that is insufficient to diffuse nickel throughout the cross-sectional thickness of substrate 101, an unreacted bulk portion 206 of substrate 101 may exist that retains the initial composition of substrate 101. On the other hand, a process that is performed at sufficient time and temperature may enrich the nickel concentration to some degree across the entire thickness of substrate 101; in such cases the enriched region 202 encompasses the entire cross sectional thickness of substrate 101 and thus there is no unreacted bulk portion 206.

Various processes may be used to dispose the nickel-enhanced region 202. For example, vapor phase deposition techniques may be applied, including techniques such as physical vapor deposition (such as evaporation, ion plating deposition, and sputtering, for instance) and chemical vapor deposition. These techniques may be applied at elevated temperatures that allow at least some interdiffusion between the material being deposited and elements from the substrate 101. Other techniques that may be applied include plating by electroless and/or electroplating processes, and slurry-based deposition processes. Combinations of various deposition processes may also be applied.

The thickness, t, of the nickel-enhanced region formed by the disposing step generally is selected to provide sufficient thickness for the subsequent aluminized region to provide the desired level of roughness reduction upon removal of the aluminized region. In some embodiments, the nickel-enhanced region is at least about 50 micrometers thick. In other embodiments, the nickel-enhanced region is less than 50 micrometers in thickness, but in a subsequent heat treatment step, described below, sufficient nickel diffuses from the nickel-enhanced region into substrate 101 to facilitate subsequent aluminizing to a desirable depth below surface 204; the depth to which a sufficient amount of nickel diffuses to adequately facilitate aluminizing is typically at least 50 micrometers, and is typically selected based on the roughness of the surface 204 to be processed—the depth is typically selected to be greater for comparatively rougher surfaces and can be lower for comparatively smoother surfaces.

The substrate is heat treated to form a diffusion zone within the substrate; that is, nickel is diffused into the substrate from the nickel-enriched region. As noted above, this heat treatment step may be, at least in part, performed simultaneously with the disposition of the nickel-enhanced region, such as when the deposition process involves elevated temperature, as is the case with many physical and chemical vapor deposition processes. Other processes such as electroplating and electroless plating involve deposition of nickel-bearing metal at the surface 204 at temperatures insufficient to activate significant diffusion into substrate, and thus a heat treatment is useful to diffuse nickel into substrate 101 to better bond the nickel-enriched region to substrate 101 and to increase the depth to which the nickel content of the substrate may be enhanced—that is, to increase the size of the nickel-enhanced region.

The heat treatment temperature and time are selected to diffuse nickel into the substrate. Typically the temperature is at least about 1000 degrees Celsius to provide a desirable level of thermal activation for the operative diffusion processes. Time at temperature is typically greater than an hour, though of course lower temperatures require longer times to move material a given distance than higher temperatures. In an illustrative embodiment, the heat treatment step includes heating the substrate to a temperature of about 1100 degrees Celsius for a time of about 8 hours.

In certain embodiments, the heat treating step is performed at pressures higher than atmospheric pressure to prevent or close diffusion-driven formation of voids, often referred to in the art as Kirkendall voids, formed as nickel diffuses into the substrate. For example, in some embodiments, the method further comprises hot isostatic pressing (HIP) of the substrate. The HIP step may be done separately from the heat treatment, or the temperature and time of the HIP step may be selected to serve additionally as the heat treatment step. The pressure level used in the HIP step is typically greater than 10 ksi (about 70 MPa) at a temperature greater than 1000 degrees Celsius, for a time sufficient to achieve the goal of the step (i.e., close porosity to the extent desired, diffuse material to a desired depth, etc.). In an illustrative embodiment, the HIP step includes pressing the substrate at a temperature of 1200 degrees Celsius and pressure of 15 ksi (about 103 MPa) for about 4 hours.

In embodiments of the present invention, the method described herein includes enriching at least a portion of the nickel-enhanced region with aluminum to form an aluminized region. The aluminized region is defined for the purposes of this description to mean the region containing a higher aluminum concentration than the concentration of aluminum in the initial composition of the substrate. The term "aluminizing" as used herein encompasses any process that results in the formation of aluminum-bearing material at or near the surface of a substrate. As noted previously, the disposition of the nickel-enhanced region and diffusion of nickel into the substrate forms material compositions at and near the surface of the substrate that may be more amenable to aluminizing than is the initial composition of the substrate, such as where the substrate comprises a significant concentration of cobalt. Any of various well-known methods for forming aluminum-bearing coatings on substrates may be suitable for use in this enriching step. For example, vapor-phase aluminiding (VPA) is a class of processes commonly used in the art to enrich the surface of high-temperature alloys with aluminum. VPA processes use a gaseous source of aluminum, such as an aluminum salt at high temperature, which reacts with the metal at the surface of the substrate to form aluminum or, more commonly, an intermetallic compound such as nickel aluminide. Other processes for aluminizing include slurry-based processes, in which an aluminum-bearing slurry is coated over the substrate surface, then heated to react the aluminum in the slurry with the surface of the substrate to form aluminide material. Other processes include deposition of an aluminum or aluminum-rich layer on the surface of the substrate, such as by sputtering or evaporation, followed by a heat treatment to diffuse the aluminum into the substrate, whereupon it reacts with substrate material to form an aluminide. In some embodiments, regardless of the method or combination of methods used to dispose aluminum-bearing material in the nickel-enhanced region, enriching the region with aluminum includes a heat treatment to diffuse and/or react aluminum within the nickel-enhanced region.

One or more aluminide phases may be formed during the aluminizing step. For instance, a layer of NiAl may form near the surface 204 where aluminum activity is relatively high, with a layer of $Ni_3Al$ forming in regions further below the surface 204, where aluminum activity is relatively lower. Of course, the formulas provided here to describe the aluminide phases forming during aluminizing are nominal compositions—those skilled in the art will appreciate that the aluminide phases may also include incidental quantities of other elements present in the substrate material, such as, but not limited to, cobalt. In an illustrative embodiment, the enriching step includes forming an aluminide phase at a depth that is at least 80% of the total thickness of the nickel-enhanced region. For example, in one embodiment a nickel-bearing aluminide phase is formed within the substrate at a depth of at least 40 micrometers below the surface during the enhancing step, and in some embodiments this depth is at least about 50 micrometers. As noted above, comparatively deeper aluminizing is usually desirable for processing comparatively rougher surfaces.

After the aluminized region has been formed, at least a portion of that region is removed. Typically, the removal is performed in a way that preferentially removes aluminide material but leaves the substrate material beneath the aluminized region substantially intact. In this way, surface asperities may be removed or substantially reduced in size, resulting in a processed surface (i.e., the surface of the substrate formed upon removal of the aluminized region) that has a processed surface roughness less than the value of the initial surface roughness. In particular embodiments, substantially all of the aluminized region is removed.

Removal of material from the aluminized region may be performed using any of various well-known processes used to remove aluminide coatings from metal substrates. Chemical stripping methods are available in the art and may be employed in some embodiments. For example, an acidic stripping solution disclosed in commonly-assigned U.S. Pat. No. 6,833,328 to Kool et al. is an aqueous solution containing an acid of the formula $H_xAF_6$ and/or precursors thereof, where A is silicon, germanium, titanium, zirconium, aluminum, or gallium, and x has a value of one to six. The stripping solution taught by Kool et al. may further contain one or more additional acids, such as nitric acid, a phosphorous-containing compound such as phosphoric acid, a mineral acid such as hydrochloric acid, etc. As taught in commonly-assigned U.S. Pat. Nos. 6,599,416, 6,758,914, 6,793,738, 6,863,738, and 6,953,533, the acidic solution of Kool et al. is effective to remove a variety of coating compositions, including diffusion aluminides, without significantly attacking the substrate beneath these coatings. Other chemicals and processes for removing aluminide coatings from substrates are known in the art and may be suitable for use in the present removal step. See, for instance, U.S. Pat. Nos. 6,494,960, 7,270,764, and 4,425,185. Similarly, electrochemical processes are known in the art and may be employed in some embodiments. Illustrative processes are described, for example, in U.S. Pat. No. 6,969,457 and U.S. Pat. No. 6,352,636.

In a particular embodiment, presented to further illustrate the techniques provided in this description, a method for reducing roughness of a surface includes disposing a nickel-enriched region at a surface of a substrate, the nickel-enriched region having a higher nickel concentration than an initial composition of the substrate, wherein the surface has an initial surface roughness, wherein the initial surface roughness is an arithmetic average roughness ($R_a$) of at least about 200 microinches (about 5 micrometers); heat treating the substrate to form a diffusion zone within the substrate; enriching at least a portion of the nickel-enriched region with aluminum to form an aluminized region; and removing at least a portion of the aluminized region to form a processed surface of the substrate; wherein, after the removing step, the processed surface has a processed roughness that is less than the initial roughness. As noted previously, the substrate includes at least 50 weight percent cobalt in some embodiments, and the processed surface roughness, in some embodiments, is less than about 95% of the initial surface roughness. Moreover, the sequence of steps noted above may be iterated one or more times to achieve further reduction in substrate surface roughness.

EXAMPLES

The following examples are presented to further illustrate non-limiting embodiments of the present invention.

A sample substrate of nominal composition Co-28Cr-6Mo was made via DMLM. A surface of the part was electroplated with nickel using a commercial plating bath composition, such that the thickness was approximately 60 micrometers, while a second surface was left without the plating. The sample was then heat treated for 8 hours at 1100 degrees Celsius to diffuse the nickel into the substrate. The part then underwent a standard vapor phase aluminizing (VPA) process, and the sample was then subjected to hot isostatic pressing (HIP) at a temperature of 1200 degrees Celsius for 4 hours at about 15 ksi (about 103 MPa). The surface plated with nickel showed greater than 50 micrometer aluminide layer, whereas the non-plated surface showed less than 10 micrometers of aluminide. After chemically stripping the aluminized layer, the surface roughness of the Ni-plated surface was reduced by greater than 50%.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for altering the surface of an article, the method comprising:
    disposing a nickel-enriched region at a surface of a substrate, wherein the substrate has an initial composition prior to the disposing, wherein the surface has an initial roughness, and wherein the nickel-enriched region has a higher nickel concentration than the initial composition of the substrate;
    heat treating the substrate to form a diffusion zone within the substrate;
    enriching at least a portion of the nickel-enriched region with aluminum to form an aluminized region; and
    removing at least a portion of the aluminized region to form a processed surface of the substrate; wherein, after the removing the processed surface has a processed surface roughness that is less than the initial roughness, wherein disposing comprises disposing a nickel-enriched region having a thickness of at least about 50 micrometers.

2. The method of claim 1, wherein disposing comprises chemical vapor deposition, physical vapor deposition, slurry-based deposition, electroless plating, electroplating, or combinations including at least one of the foregoing.

3. The method of claim 1, wherein the substrate comprises cobalt, nickel, iron, or combinations including at least one of the foregoing.

4. The method of claim 1, wherein the initial composition of the substrate comprises at least 50 percent by weight cobalt.

5. The method of claim 1, wherein the initial composition of the substrate comprises cobalt and chromium.

6. The method of claim 1, wherein the substrate comprises additively manufactured material.

7. The method of claim 1, wherein the surface is an internal surface of the substrate.

8. The method of claim 1, wherein heat treating is performed at a temperature of at least about 1000 degrees Celsius.

9. The method of claim 1, further comprising isostatically pressing the article.

10. The method of claim 1, wherein enriching comprises vapor phase aluminizing, slurry aluminizing, or combinations including at least one of the foregoing.

11. The method of claim 1, further comprising iterating at least once a step sequence comprising the disposing, heat treating, enriching, and removing steps.

12. The method of claim 1, wherein the initial composition comprises up to about 25 percent by weight nickel.

13. The method of claim 1, wherein removing comprises chemically or electrochemically removing material.

14. The method of claim 1, wherein the processed surface roughness is less than about 95% of the initial roughness.

15. The method of claim 1, wherein the surface has an arithmetic average roughness ($R_a$) of at least about 200 microinches prior to the disposing.

16. A method for reducing roughness of a surface, comprising:
    disposing a nickel-enriched region at a surface of a substrate, the nickel-enriched region having a higher nickel concentration than an initial composition of the substrate, wherein the surface has an initial surface roughness, wherein the initial surface roughness is an arithmetic average roughness (Re) of at least about 200 microinches, wherein disposing comprises disposing a nickel-enriched region having a thickness of at least about 50 micrometers;
    heat treating the substrate to form a diffusion zone within the substrate;
    enriching at least a portion of the nickel-enriched region with aluminum to form an aluminized region; and
    removing at least a portion of the aluminized region to form a processed surface of the substrate; wherein, after the removing step, the surface has a processed roughness that is less than the initial roughness.

17. The method of claim 16, wherein the initial composition of the substrate comprises at least 50 percent by weight cobalt.

18. The method of claim 16, further comprising iterating at least once a step sequence comprising the disposing, heat treating, enriching, and removing steps.

19. The method of claim 16, wherein the processed surface of the substrate has a processed surface roughness less than about 95% of the initial surface roughness.

* * * * *